United States Patent
Barnum

[11] 3,762,369
[45] Oct. 2, 1973

[54] PET SANITARY LITTER FACILITY
[75] Inventor: Viola Hall Barnum, New York, N.Y.
[73] Assignee: The Raymond Lee Organization, Inc., New York, N.Y.
[22] Filed: Feb. 1, 1972
[21] Appl. No.: 222,472

[52] U.S. Cl. .................................................. 119/1
[51] Int. Cl. ............................................ A01k 29/00
[58] Field of Search ................................. 119/1, 29

[56] References Cited
UNITED STATES PATENTS

| | | |
|---|---|---|
| 2,741,223 | 4/1956 | Winburn, Jr. ........................... 119/1 |
| 3,227,138 | 1/1966 | Campbell ............................... 119/1 |
| 3,377,990 | 4/1968 | Mitchell .................................. 119/1 |
| 3,688,741 | 9/1972 | Thompson et al. ..................... 119/1 |
| 2,053,594 | 9/1936 | Albert ..................................... 119/1 |
| 2,306,014 | 12/1942 | Carson ................................... 119/1 |
| 3,332,397 | 7/1967 | Vander Wall .......................... 119/1 |
| 3,455,277 | 7/1969 | Edwards ................................ 119/1 |

Primary Examiner—Louis G. Mancene
Assistant Examiner—James H. Czerwonky
Attorney—Howard I. Podell

[57] ABSTRACT

A sanitary litter facility for use by pets, which is portable and readily cleansed. The device is in the form of an open pan in which a detachable platform is mounted to the container sides. Opposite sides of the container each have a mounting slot to receive a protrusion extending from each end of the platform. The platform is designed to support the weight of an animal pet, and is designed with a large open slot to enable the excrement of a pet, resting on the platform, to be gathered on the pan bottom. A flexible tube, for flushing the container, is fastened to one container side, with the free end of the tube fitted with a flexible socket for fastening over a water faucet. The container is preferably fabricated of plastic, with the detachable platform fabricated of a stainless steel.

1 Claim, 2 Drawing Figures

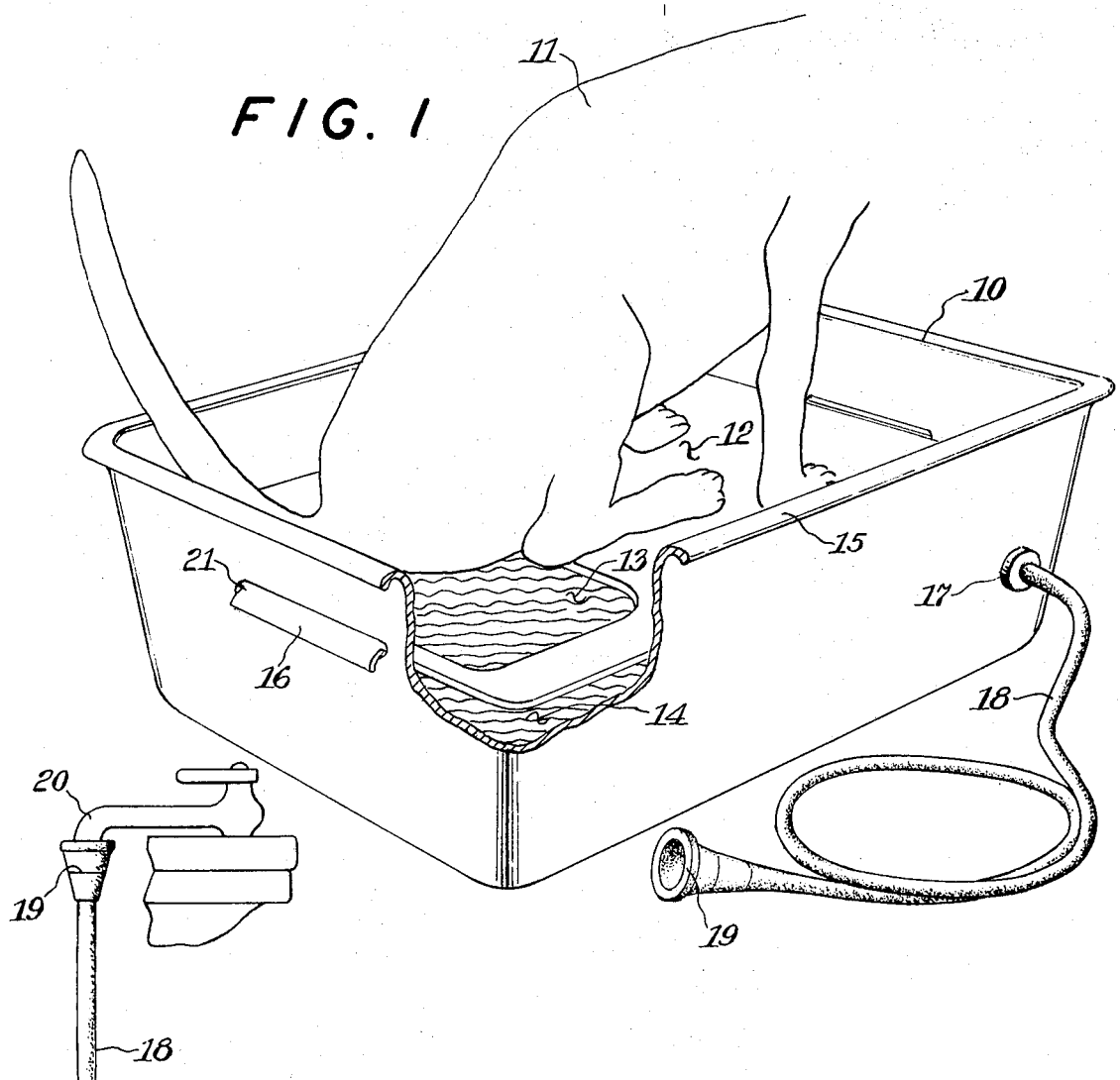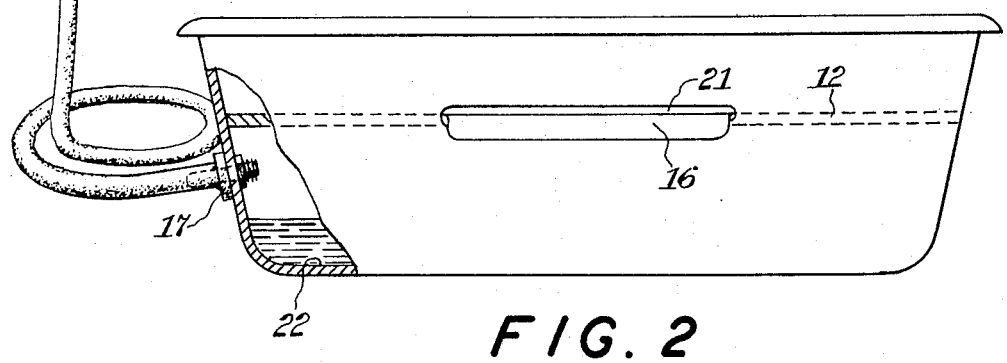

PET SANITARY LITTER FACILITY

SUMMARY OF THE INVENTION

This invention relates to a device for use by dogs, cats and other pets as a sanitary litter container.

An advantage of the invention is that the device is portable and is readily cleaned after use, enabling the owners of pets to cooperate with the current public campaigns to free the streets of urban and suburban areas from animal litter and excrement.

The device consists of an open pan, preferably fabricated of a semi-rigid plastic material such as heavy-duty polyethelene material. A stainless steel platform is located above the container bottom by means of protrusions on the platform which fit into slots in the sides of the container. The platform is shaped so as to support an animal, and is designed with a large opening, adjacent to one end of the platform, to permit the animal on the platform to exrete directly into the container bottom, in which suitable deodorant solution may be placed. A flexible plastic tube is attached to a fitting in the side of the container, the other end of the tube terminating in a flexible socket, adaptable for fastening over a water faucet. The tube, when attached to a water supply, permits the container to be readily flushed and cleansed, with the platform removed.

BRIEF DESCRIPTION OF THE DRAWING

The objects and features of the invention may be understood with reference to the following detailed description of an illustrative embodiment of the invention, taken together with the accompanying drawing in which:

FIG. 1 is a perspective exploded view of the device: and

FIG. 2 is a side view of the device.

DESCRIPTION OF THE PREFERRED EMBODIMENT

Turning now descriptively to the drawing, in which similar reference characters denote similar elements throughout the several views, FIG. 1-2 illustrate the open container 10 formed with external rounded lips 15 along the top edges. The container 10 is preferably fabricated of a heavy-duty polyethelene plastic material. A horizontal slot 21 in two opposing sides of the container serves to anchor curved protrusions 16 of the stainless steel platform 12 which is mounted above the bottom 22 of the container. A solution of deodorant 14 may be placed in the bottom of the container. A large open slot 13 is located in the platform 12 adjacent to the side edges of one side of the platform 12 to permit an animal 11 on the platform 12 to excrete directly into the container below the platform.

Flexible tube 18 is coupled to mounted fitting 17 located in a side of the container between the bottom 22 and the platform 12. The flexible socket 19 at the free end of the tube 18 may be mounted over a faucet 20 to permit flushing the container with running water. Platform 12 is readily detached from the container sides, when cleaning the device 10.

Since obvious changes may be made in the specific embodiment of the invention described herein, it is indicated that all matter contained herein is intended as illustrative and not as limiting in scope.

Having thus described my invention, what I claim as new and desire to secure by Letters Patent of the United States is:

1. A sanitary facility adaptable for the use of dogs, cats, or other animal pets consisting of an open container in which a detachable platform is fastened to the container sides above the container bottom, opposite sides of said container each having a slot therein, said platform having a large open slot near one side of the platform, together with a hollow fitting mounted in the side of said container above the container bottom, said fitting being adaptable to be fastened to an external flexible tubing, said platform having a protrusion extending from each of two opposing ends of the platform and which matingly fasten into one of said respective slots in each of said two opposing sides of the container, so as to fasten said platform to the container above the container bottom.

\* \* \* \* \*